United States Patent
Ali et al.

(10) Patent No.: US 10,798,182 B2
(45) Date of Patent: Oct. 6, 2020

(54) APPLICATION FUNCTION CONTROL OF IP ADDRESS ALLOCATION

(71) Applicant: Cisco Technology, Inc., San Jose, CA (US)

(72) Inventors: Irfan Ali, Palo Alto, CA (US); Humberto Jose La Roche, Ocean, NJ (US); Aeneas Sean Dodd-Noble, Andover, MA (US); Ravi Kiran Guntupalli, Cumming, GA (US); Ravi Shekhar, Pune (IN)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 16/201,005

(22) Filed: Nov. 27, 2018

(65) Prior Publication Data

US 2019/0356742 A1    Nov. 21, 2019

Related U.S. Application Data

(60) Provisional application No. 62/673,088, filed on May 17, 2018.

(51) Int. Cl.
*H04L 29/08* (2006.01)
*H04L 29/12* (2006.01)

(52) U.S. Cl.
CPC ........ *H04L 67/141* (2013.01); *H04L 61/2007* (2013.01); *H04L 67/143* (2013.01)

(58) Field of Classification Search
None
See application file for complete search history.

(56) References Cited

U.S. PATENT DOCUMENTS

| 8,185,152 | B1 | 5/2012 | Goldner | |
|---|---|---|---|---|
| 2004/0052216 | A1 | 3/2004 | Roh | |
| 2018/0097894 | A1* | 4/2018 | Li | H04L 47/19 |
| 2018/0098251 | A1* | 4/2018 | Li | H04W 36/0016 |
| 2018/0192390 | A1* | 7/2018 | Li | H04W 80/10 |
| 2018/0192471 | A1* | 7/2018 | Li | H04W 60/04 |
| 2018/0198867 | A1* | 7/2018 | Dao | H04W 76/34 |
| 2018/0199240 | A1* | 7/2018 | Dao | H04W 76/10 |
| 2018/0199398 | A1* | 7/2018 | Dao | H04W 36/0022 |
| 2018/0227743 | A1* | 8/2018 | Faccin | H04W 24/02 |

(Continued)

OTHER PUBLICATIONS

Agaur, "Session and Service Continuity Evolution in 5G Networks", Feb. 28, 2018, and retrieved (Year: 2018).*

(Continued)

*Primary Examiner* — Jamaal Henson (57) ABSTRACT

In accordance with various embodiments, a method is performed including establishing a first communication session between an application function and a user equipment assigned a first IP address. The method includes determining, by the application function, that the user equipment has changed location. The method includes, in response to determining that the user equipment has changed location, sending, by the application function, a request that the user equipment be assigned a second IP address. The method includes establishing a second communication session between the application function and the user equipment assigned the second IP address.

20 Claims, 8 Drawing Sheets

(56) References Cited

U.S. PATENT DOCUMENTS

2019/0319991 A1* 10/2019 Friedrich ............ H04L 61/2076

OTHER PUBLICATIONS

3GPP Organizational Partners, "3rd Generation Partnership Project; Technical Specification Group Services and System Aspects; System Architecture for the 5G System; Stage 2 (Release 15)", 3GPP TS 23.501 V15.1.0, Mar. 2018, 201 pages.

3GPP Organizational Partners, "3rd Generation Partnership Project; Technical Specification Group Services and System Aspects; Procedures for the 5G System; Stage 2 (Release 15)", 3GPP TS 23.502 V15.1.0, Mar. 2018, 285 pages.

3GPP Organizational Partners, "3rd Generation Partnership Project; Technical Specification Group Services and System Aspects; Study on enhancement of EPC for low latency communication including device mobility (Release 16)", 3GPP TR 23.739 V0.3.0, May 2018, 24 pages.

3GPP Organizational Partners, "3rd Generation Partnership Project; Technical Specification Group Services and System Aspects; Policy and Charging Control Framework for the 5G System; Stage 2 (Release 15) The present", 3GPP TS 23.503 V15.1.0, Mar. 2018, 65 pages.

\* cited by examiner

APPLICATION FUNCTION CONTROL OF IP ADDRESS ALLOCATION

CROSS-REFERENCE TO RELATED APPLICATIONS

This application claims priority to U.S. Provisional Patent App. No. 62/673,088, filed on May 17, 2018, entitled "Application Function Control of IP Address Allocation," and hereby incorporated by reference in its entirety.

TECHNICAL FIELD

The present disclosure generally relates generally to network IP address allocation, and in particular, to network IP address allocation by an application function (AF).

BACKGROUND

In various mobile networks, the IP address of a user equipment (UE) may be changed during the registration period of the UE. Three modes of operation have been defined:
(1) SSC Mode 1: The IP address of the UE does not change during registration period.
(2) SSC Mode 2: The IP address of the UE may be changed. A new IP connection (e.g., PDU session corresponding to new IP address) is created after the previous/existing IP connection (PDU session corresponding to an older IP address) of the UE is removed.
(3) SSC Mode 3: The IP address of the UE may be changed. A new IP connection is created before the previous/existing IP connection of the UE is removed.

BRIEF DESCRIPTION OF THE DRAWINGS

For a better understanding of aspects of the various embodiments described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Various embodiments disclosed herein include devices, systems, and methods for establishing a communication session. The method includes establishing a first communication session between an application function (AF) and a user equipment (UE) assigned a first IP address. The method includes determining, by the AF, that the UE has changed location. The method includes, in response to determining that the UE has changed location, sending, by the AF, a request that the UE be assigned a second IP address. The method includes establishing a second communication session between the AF and the UE assigned the second IP address.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

EXAMPLE EMBODIMENTS

Whereas the IP address of a user equipment (UE) can be changed during the registration period, in various implementations, an application function (AF) controls when the IP address of the UE is changed. In various implementations, the IP address of a UE may be changed based on static triggers in the SMF (session management function), e.g., when the UE has moved "far" from the serving UPF (user plane function) and there is another UPF closer to the UE). However, for multi-access edge computing (MEC), the AF with which the user is communicating with may be better aware of to the geographic location data or compute resources are cached which can be used by the UE and, thus, can better control when the IP address of the UE should be changed to access the local cache. This decision can be based on geographic location of the UE and/or requirements of the application that the UE is currently engaged in.

Figure 1A:
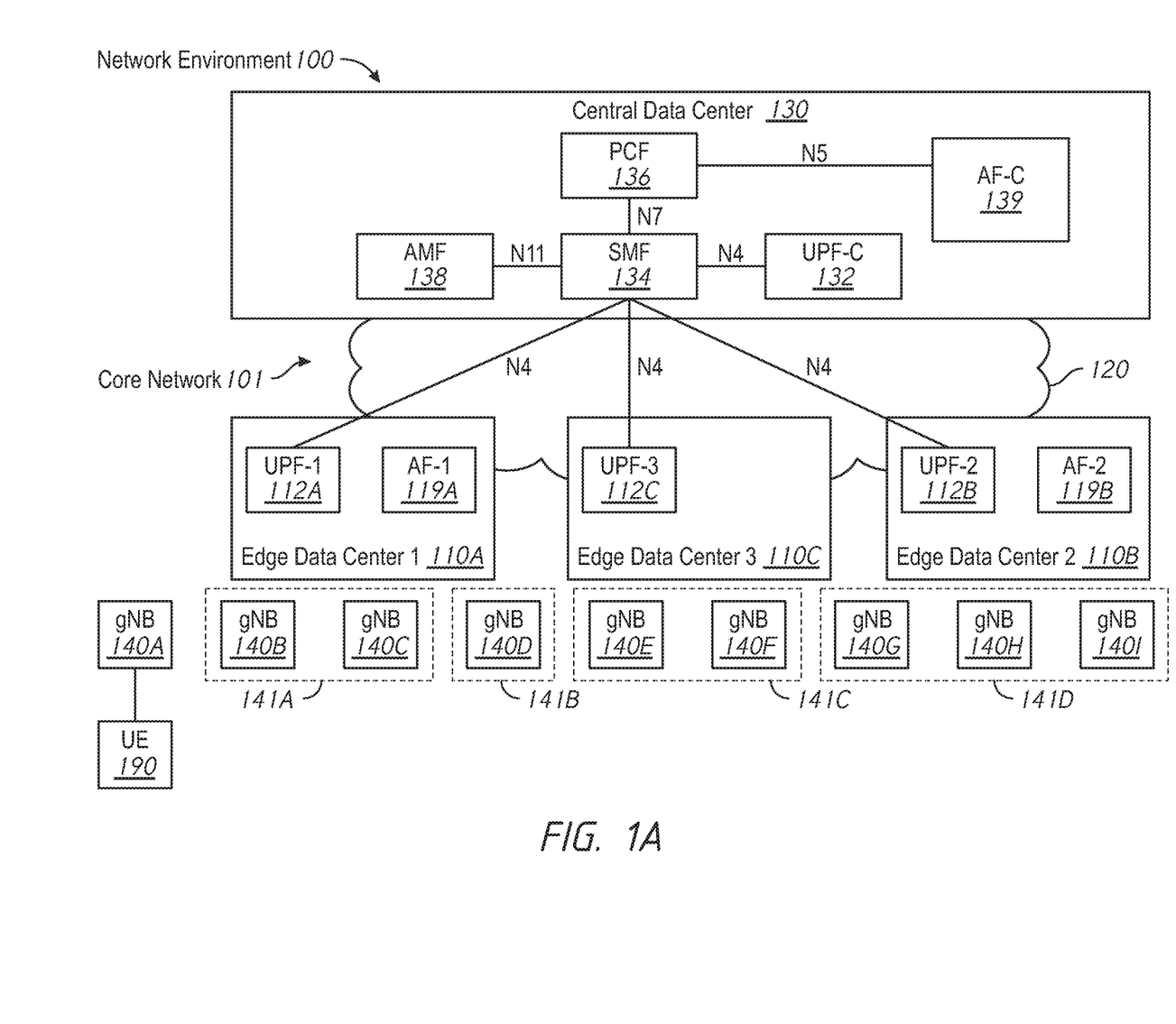
FIG. 1A is a block diagram of a network environment at a first time in accordance with some embodiments.

FIG. 1A illustrates a block diagram of a network environment 100 at a first time in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the fabric network environment 100 includes a core network 101. The fabric network environment 100 includes a plurality of access nodes 140A-140I coupled to the core network 101. The fabric network environment 100 includes a user equipment (UE) 190 associated with a first access node 140A of the plurality of access nodes 140A-140I. In various implementations, the core network 101 is a 5G network. In various implementations, the access nodes 140A-140I are gNodeBs. In various implementations, the UE 190 is a smartphone, a tablet, a laptop, or other portable electronic device.

The core network 101 includes a central data center 130 and a plurality of edge data centers 110A-110C interconnected by a network infrastructure 120. The network infrastructure 120 including one or more interconnected intermediate nodes (e.g., switches or routers) that couple the central data center 130 and the plurality of edge data centers 110A-110C. In various implementations, the plurality of access nodes 140A-140I are also interconnected by the network infrastructure 120 to each other, the central data center 130, and the plurality of edge data centers 110A-110C.

The central data center 130 includes computer resources that implement a number of network functions. The network functions include an access and mobility management function (AMF) 138 that performs, among other things, registration management, connection management, mobility management, access authentication and authorization, and security context management. The network functions include a session management function (SMF) 134 that performs, among other things, session management (session establishment, modification, release), user equipment IP address allocation & management, DHCP functions, DL data notification, and traffic steering configuration for proper traffic routing. The network functions include a policy control function (PCF) 136 that performs, among other things, providing a unified policy framework, providing policy rules to control plane functions, and access subscription information for policy decisions. The network functions include a central user plane function (UPF-C) 132 that performs, among other things, packet routing and forwarding, packet inspection, QoS handling, and is an anchor point for intra- and inter-RAT mobility. The network functions include a central application function (AF-C) 139 that performs, among other things, influencing traffic routing, accessing NEF, and interaction with policy framework for policy control. The AF-C 139 is associated with an application providing content or services to the UE 190. For example, in various implementations, the AF-C 139 is associated with a video streaming service that provides video content to the UE 190.

A first edge data center 110A of the plurality of edge data centers 110A-110C includes computing resources that implement a first edge user plane function (UPF-1) 112A and a first edge application function (AF-1) 119A. In association with the AF-1 119A, the first edge data center 110A includes computing resources for the application to provide content or services to the UE 190. For example, in various implementations, the first edge data center 110A includes caches of video content. A second edge data center 110B of the plurality of edge data centers 110A-110C includes computing resources that implement a second edge user plane function (UPF-2) 112B and a second edge application function (AF-2) 119B. In association with the AF-2 119B, the second edge data center 110B includes computing resources for the application to provide content or services to the UE 190. A third edge data center 110C of the plurality of edge data centers 110A-110C includes computing resources that implement a third edge user plane function (UPF-3) 112C. However, the third edge data center 110C does not implement an edge AF or include computing resources for providing the application.

In the central data center 130, the AF-C 139 communicates with the PCF 136 via an N5 interface. The SMF 134 communicates with the PCF 136 via an N7 interface and with the AMF 138 via an N11 interface. The SMF 134 communicates with the UPF-C 132 via an N4 interface. Similarly, the SMF 134 communicates with the UPF-1 112A, UPF-2 112B, and the UPF-3 112C via an N4 interface.

In various implementations, the central data center 130 includes computing resources geographically distributed in a cloud formation. However, in various implementations, the central data center 130 is also located at a discrete geographic location.

Each of the plurality of edge data centers 110A-110C includes computing resources at a discrete geographic location. Similarly, each of the access nodes 140A-140I are located at respective discrete geographic locations. In various implementations, one or more of the access nodes 140A-140I includes multiple cell sites (e.g., using cloud principles). Nevertheless, each of the access node 140A-140I is associated with a respective geographic location (which may be larger than a single point). Accordingly, a particular access node may be close to one edge data center and far from another edge data center. Thus, the user experience (e.g., latency, loss, available bandwidth, etc.) of a UE using the computing resources of different ones of the plurality of edge data centers 110A-110C (or the computing resources of the central data center 130) may differ depending on the location of the access node with which the user equipment 190 is associated.

Various ones of the plurality of access nodes 140A-140I are grouped into groups based on their geographic location. For example, the second access node 140B and third access node 140C are grouped into a first group 141A, the fourth access node 140D is grouped into a second group 141B, the fifth access node 140E and the sixth access node 140F are grouped into a third group 141C, and the seventh access node 140G, eighth access node 140H, and ninth access node 140I are grouped into a fourth group 141D. Further, one or more groups of access nodes can be further grouped into supergroups. In various implementations, each group of access nodes 141A-141D is associated with a group identifier, e.g., a tracking area identity (TAI). Similarly, each edge data center 110A-110C is associated with an edge data center identifier, e.g., a data network access identifier (DNAI).

Because the user experience of a UE using the computing resources of different ones of the plurality of edge data centers 110A-110C (or the computing resources of the central data center 130) may differ depending on the location of the access node with which the UE 190 is associated, when the UE 190 is associated with an access node close to an edge data center including computing resources to provide and application, it is desirable that the UE 190 access those computing resources rather than computing resources of another edge data center or the central data center. Accordingly, in various implementations, when such circumstances are detected, the IP address of the UE 190 is changed, causing the UE 190 to connect to the network via the user plane function of that edge data center.

To that end, the AF-C 139 sends, via the N5 interface to the PCF 136, a request for a notification when the user equipment 190 changes location. In various implementations, the request includes one or more presence reporting areas (PRAs) that each specify one or more access nodes (e.g., by reference to group identifiers or access node identifiers). In response, the PCF 136 sends a similar request to the SMF 134 via the N7 interface. Further, the SMF 134 sends a similar request to the AMF 138 via the N11 interface.

When the user equipment 190 associates with an access node specified by one or more of the PRAs, the AMF 138 sends, via the N11 interface to the SMF 134, a notification that the UE 190 has changed location. In response, the SMF 134 sends, via the N7 interface to the PCF 136, a notification that the UE 190 has changed location. Further, the PCF 136 sends, via the N5 interface to the AF-C 139, a notification that the UE 190 has changed location. In particular, the AF-C 139 receives a notification that the UE 190 has associated with a specified access node. In response, the AF-C 139 sends, via the N5 interface to the PCF 136, a request that the UE 190 be assigned a new IP address. In response, the PCF 136 sends a similar request to the SMF 134 via the N7 interface.

Then, the SMF 134 assigns the UE 190 a new IP address allowing the UE 190 to communicate via the UPF of the close edge data center including computing resources for providing the application, thereby improving the user experience.

Figure 1B:
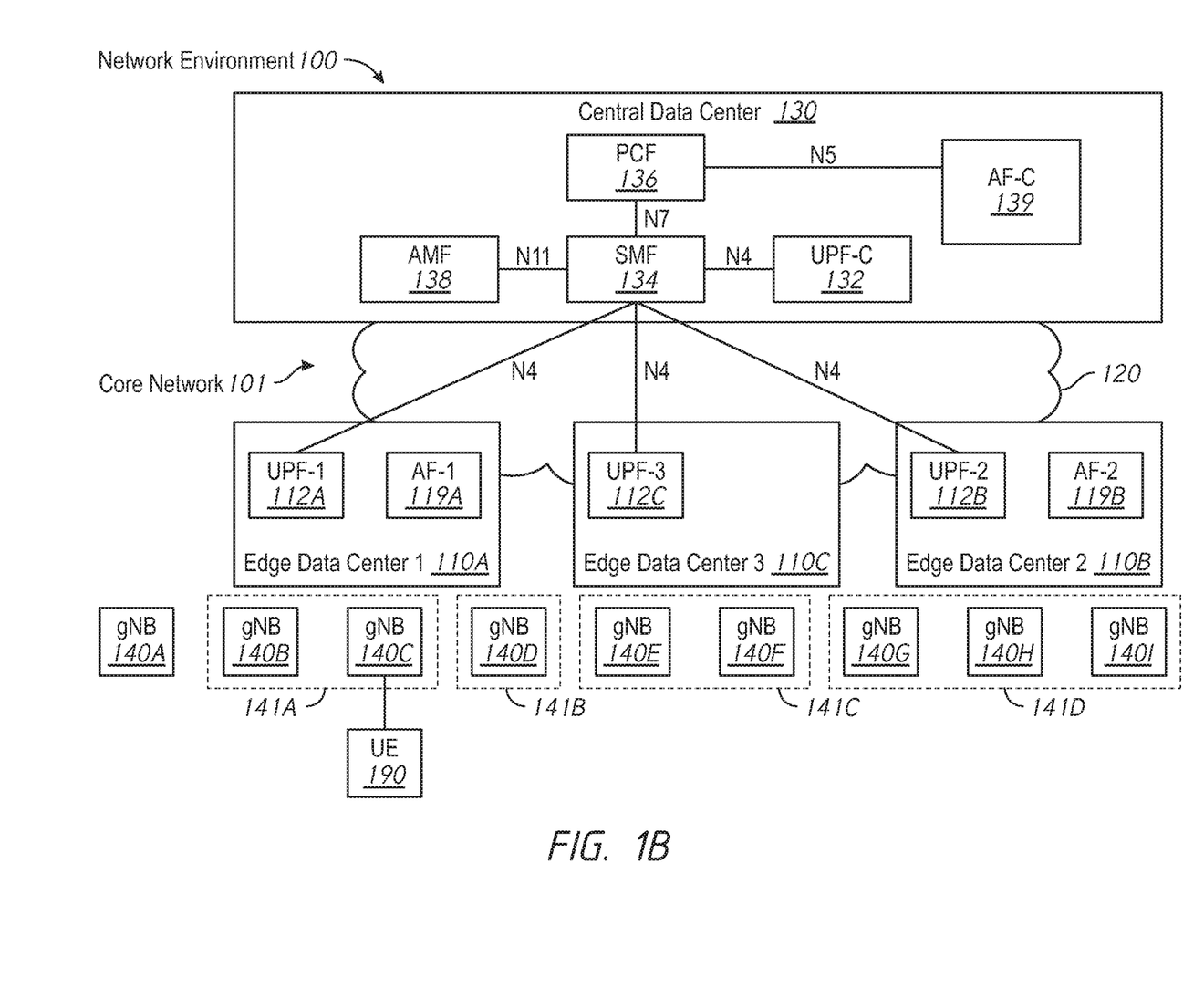
FIG. 1B is a block diagram of the network environment of FIG. 1A at a second time in accordance with some embodiments.

FIG. 1B illustrates the network environment 100 of FIG. 1A at a second time in accordance with some implementations. As compared to FIG. 1A in which the UE 190 is associated with the first access node 140A, in FIG. 1B, the UE 190 is associated with the third access node 140B.

Figure 1C:
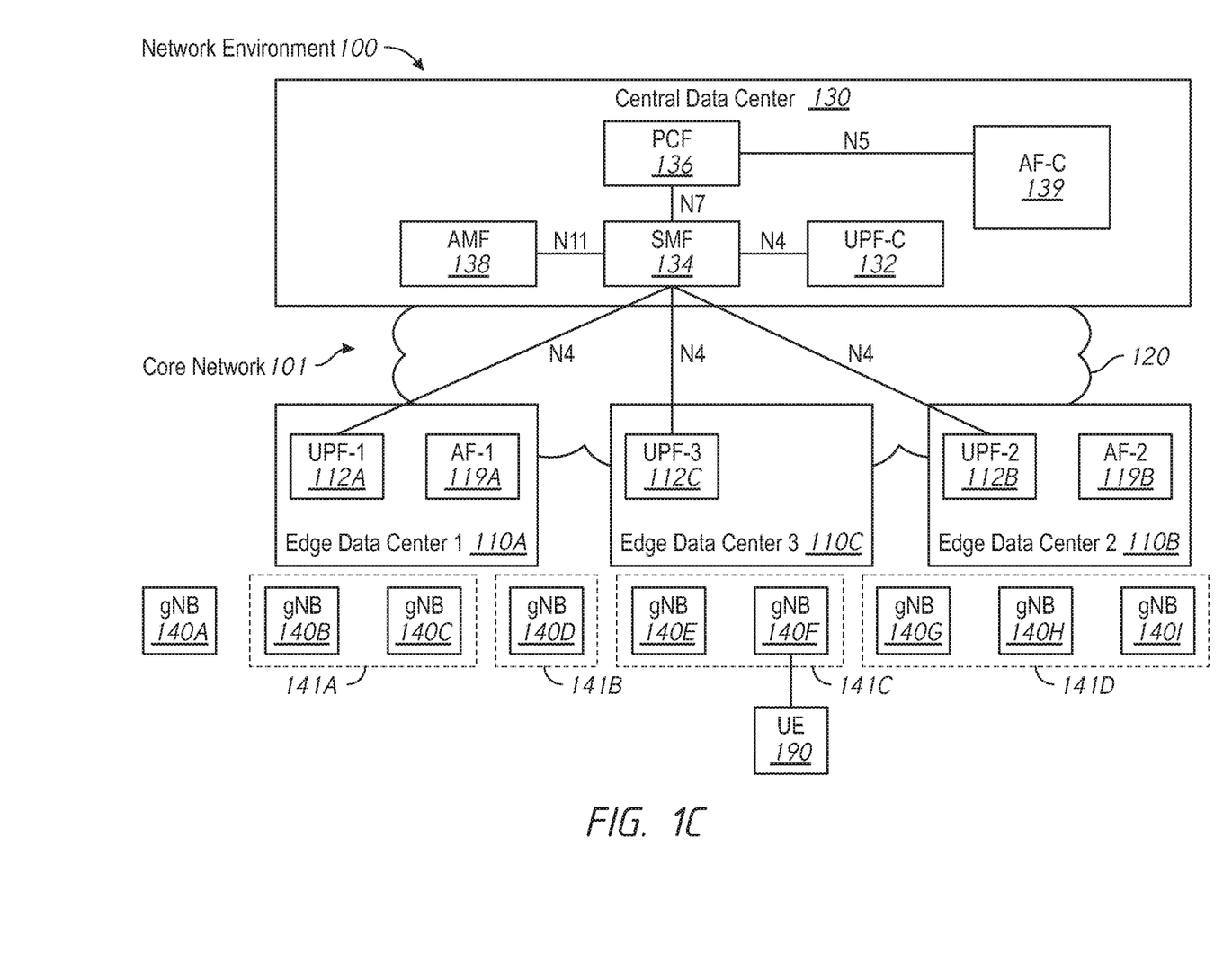
FIG. 1C is a block diagram of the network environment of FIG. 1A at a third time in accordance with some embodiments.

FIG. 1C illustrates the network environment 100 of FIG. 1A at a third time in accordance with some implementations. In FIG. 1C, the UE 190 is associated with the sixth access node 140F.

Figure 1D:
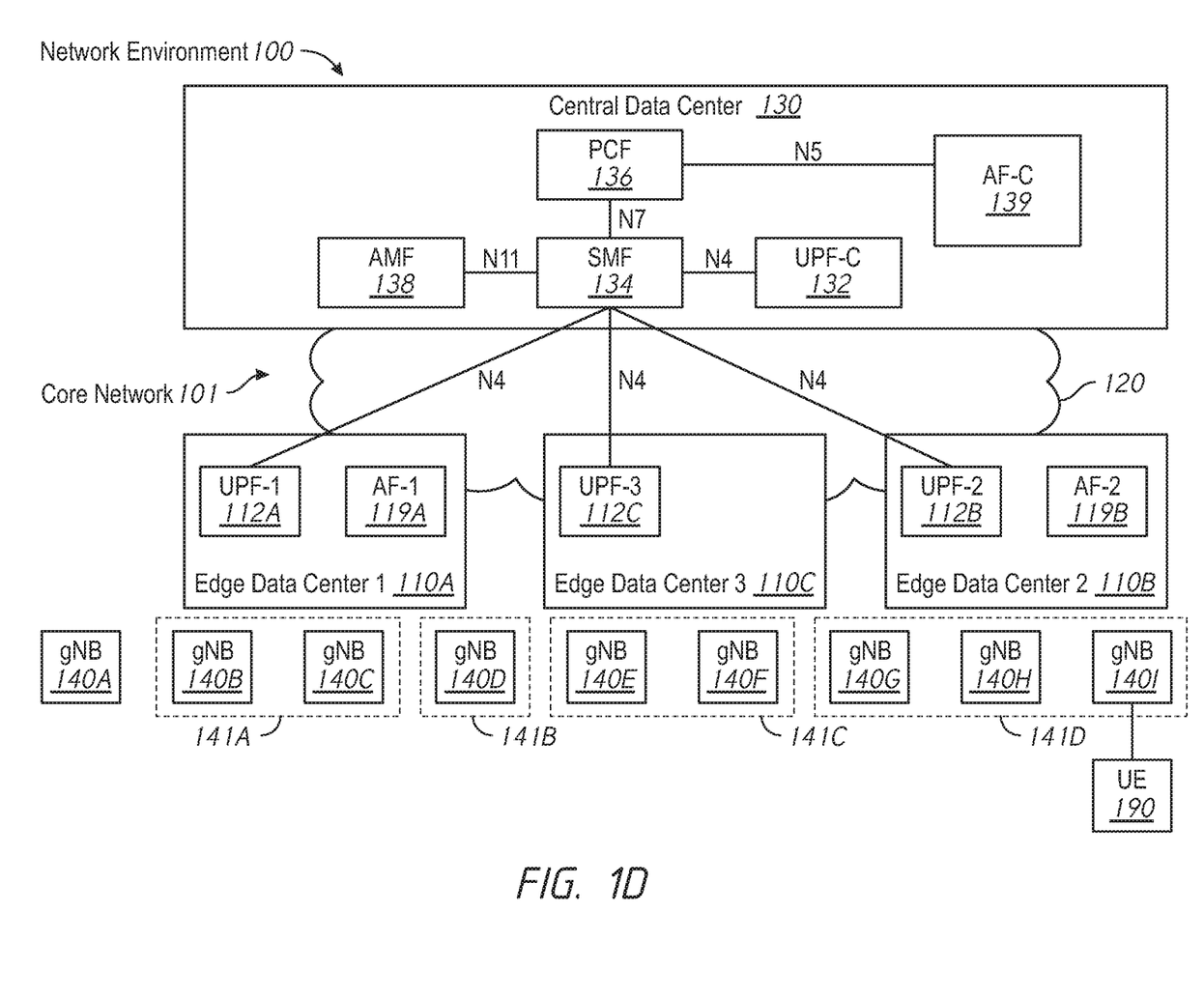
FIG. 1D is a block diagram of the network environment of FIG. 1A at a fourth time in accordance with some embodiments.

FIG. 1D illustrates the network environment 100 of FIG. 1A at a fourth time in accordance with some implementations. In FIG. 1D, the UE 190 is associated with the ninth access node 140I.

Figure 2A:
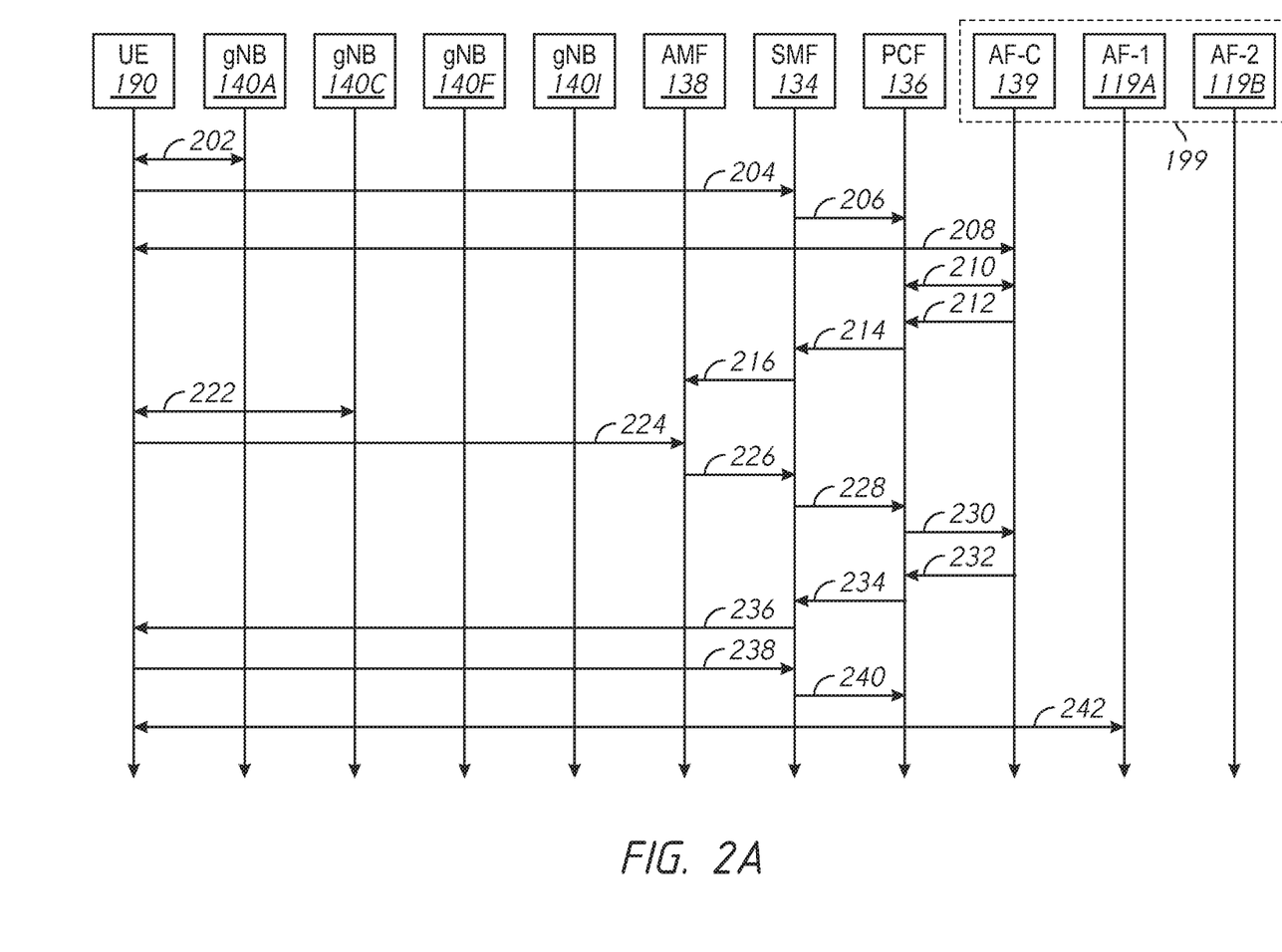
FIGS. 2A-2B illustrate an example signaling diagram described with respect to FIGS. 1A-1D.
Figure 2B:
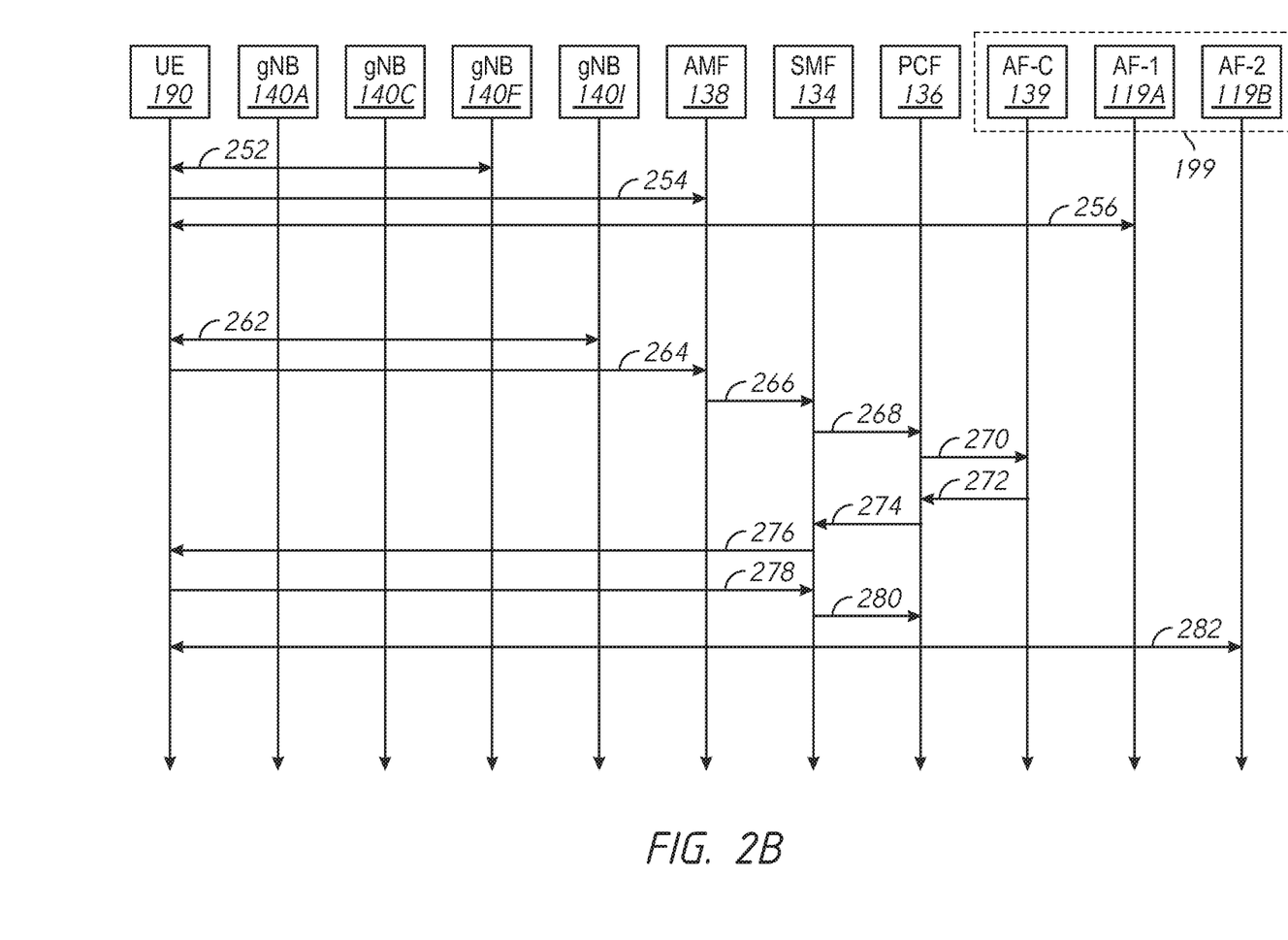

FIGS. 2A-2B illustrate an example signaling diagram described with respect to FIGS. 1A-1D. FIGS. 2A-2B illustrates various signals between the UE 190, the first access node 140A, the third access node 140C, the sixth access node 140F, the ninth access node 140I, the AMF 138, the SMF 134, the PCF 136, and an AF 199 embodied by AF-C 139, AF-1 119A, and AF-2 119B. Those of ordinary skill in the art will appreciate that additional signals (e.g., acknowledgments and intermediate signaling) can be sent and transmitted but are omitted for the sake of clarity.

Referring to FIG. 2A, at the first time of FIG. 1A, the UE 190 associates 202 with the first access node 140A. Further, the UE 190 sends, via the first access node 140A, a PDU session establishment request 204 to the SMF 134. The PDU session establishment request 204 includes an indication that the SSC Mode is 2 or 3, thereby indicating that an IP address change can be handled by the UE 190. At this state, the IP traffic of the UE 199 flows via UPF-C 132. The SMF 134 sends a PCC session establishment request 206 to the PCF 136 that establishes a first communication session for the UE 190 by assigning a first IP address to the UE 190. Further, the PCC session establishment request 206 includes an indication that the SSC Mode is 2 or 3. Thus, the PCF 136 is informed of the first IP address of the UE 190 and the SSC Mode of the PDU session of the UE 190.

With the first communication session established, the UE 190 communicates 208 with the AF-C 139 (via UPF-C 132) whereby the AF-C 139 provides an application to the UE 190. Accordingly, a first communication session is established between the AF 199 and the UE 190 assigned the first IP address.

In response to establishment of the first communication session between the AF 199 and the UE 190, the AF-C 139 and the PCF 136 exchange N5 interface establishment communications 210 (e.g., a request and a response) to establish an N5 interface between the AF-C 139 and the PCF 136. Via the established N5 interface, the AF-C 139 sends, to the PCF 136, a location update subscribe 212 which constitutes a request for a notification when the UE 190 changes location. With reference to FIGS. 1A-1D, the location update subscribe 212 includes a first presence reporting area (PRA) specifying the second access node 140B, the third access node 140C, and the fourth access node 140D (either by reference to the access nodes 140B-140D or their groups 141A-141B) and the location update subscribe 212 includes a second PRA specifying the seventh access node 140G, the eighth access node 140H, and the ninth access node 140I (either by reference to the access nodes 140G-140I or their group 141D).

In response to receiving the location update subscribe 212, the PCF 136 sends, to the SMF 134, a location update subscribe 214 indicating the first PRA and the second PRA. Further, the SMF 134 sends a location update subscribe 216 to the AMF 138.

At the second time of FIG. 1B, the UE 190 associates 222 with the third access node 140C. In response to associating with the third access node 140C, the UE 190 sends, to the AMF 138, a registration update 224 indicating that the UE 190 has changed association to the third access node 140C. Because the AMF 138 received the location update subscribe 216 indicating the third access node 140C and the registration update 224 indicating the third access node 140C (e.g., the specified access nodes match), the AMF 138 sends a location update 226 to the SMF 134. Similarly, because the SMF 134 received the location update subscribe 214 indicating the third access node 140C and the location update 226 indicating the third access node 140C, the SMF 134 sends a location update 228 to the PCF. Further, because the PCF 136 received the location update subscribe 212 indicating the third access node 140C and the location update 228 indicating the third access node 140C, the PCF 136 sends a location update 230 to the AF-C 139. Thus, the AF 199 determines that the UE 190 has changed location. In particular, the AF 199 determines that the UE 190 has changed location by sending a request for a notification when the UE 190 changes location in the form of the location update subscribe 212 and receiving a notification that the UE 190 has changed location in the form of the location update 230.

In response to determining that the UE 190 has changed location, the AF-C 139 sends, via the N5 interface to the PCF 136, an IP change request 232. In response, because the SSC Mode is 2 or 3, the PCF 136 sends an IP change request 234 to the SMF 134.

In response to receiving the IP change request 234, the SMF 134 sends, to the UE 190, a session delete command 236. In some embodiments, the session delete command 236 disestablishes the first communication session. In some embodiments, the session delete command 236 sets a delayed-release time after which the first communication session is disestablished.

In response to the session delete command 236, the UE 190 sends, via the third access node 140C, a PDU session establishment request 238 to the SMF 134. The SMF 134 sends a PCC session establishment 240 to the PCF 136 that establishes a second communication session for the UE 190 by assigning a second IP address to the UE 190. At this state, the IP traffic of the UE 199 flows via UPF-1 112A.

In some embodiments, the session delete command 236 disestablishes a PDU session (e.g., between the UE 190 and the SMF 134), but does not disestablish a PCC session or AF session (e.g., between the UE 190 and, ultimately, the AF 199). Thus, rather than sending a PCC session establishment 240 to the PCF 136, the SMF 134 sends a PCC modification request to the PCF 136 that establishes the second communication session by modifying the first communication session (to indicate the second IP address rather than the first IP address).

With the second communication session established, the UE 190 communicates 242 with the AF-1 119A (via UPF-1 112A) whereby the AF-1 119A provides the application to the UE 190. Accordingly, a second communication session is established between the AF 199 and the UE 190 assigned the second IP address.

Referring to FIG. 2B, at the third time of FIG. 1C, the UE 190 associates 252 with the ninth access node 140I. In response to associating with the ninth access node 140I, the UE 190 sends, to the AMF 138, a registration update 264 indicating that the UE 190 has changed association to the ninth access node 140C.

Because the AMF 138 received the location update subscribe 216 indicating the ninth access node 140I and the registration update 264 indicating the ninth access node 140I, the AMF 138 sends a location update 266 to the SMF 134. Similarly, because the SMF 134 received the location update subscribe 214 indicating the ninth access node 140I and the location update 266 indicating the ninth access node 140I, the SMF 134 sends a location update 268 to the PCF. Further, because the PCF 136 received the location update subscribe 212 indicating the ninth access node 140I and the location update 268 indicating the ninth access node 140I, the PCF 136 sends a location update 270 to the AF-C 139. Thus, the AF 199 determines that the UE 190 has changed location. In particular, the AF 199 determines that the UE 190 has changed location by sending a request for a notification when the UE 190 changes location in the form of the location update subscribe 212 and receiving a notification that the UE 190 has changed location in the form of the location update 270.

In response to determining that the UE 190 has changed location, the AF-C 139 sends, via the N5 interface to the PCF 136, an IP change request 272. In response, the PCF 136 sends an IP change request 274 to the SMF 134.

In response to receiving the IP change request 274, the SMF 134 sends, to the UE 190, a session delete command 276. In some embodiments, the session delete command 276 disestablishes the first communication session. In some embodiments, the session delete command 276 sets a delayed-release time after which the first communication session is disestablished.

In response to the session delete command 276, the UE 190 sends, via the ninth access node 140I, a session establishment request 278 to the SMF 134. The SMF 134 sends a session establishment 280 to the PCF 136 that establishes a third communication session for the UE 190 by assigning a third IP address to the UE 190. At this state, the IP traffic of the UE 199 flows via UPF-2 112B.

With the third communication session established, the UE 190 communicates 282 with the AF-2 119B (via UPF-2 112B) whereby the AF-2 119B provides the application to the UE 190. Accordingly, a third communication session is established between the AF 199 and the UE 190 assigned the third IP address.

Figure 3:
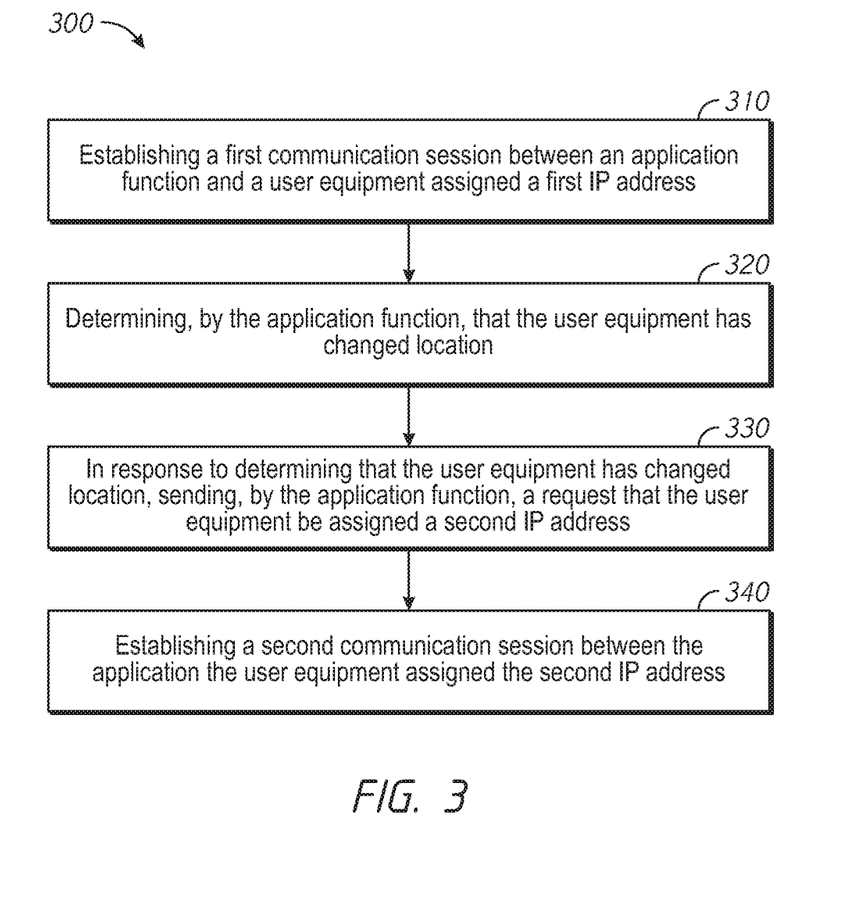
FIG. 3 is a flowchart representation of a method of establishing a communication session in accordance with some embodiments.

FIG. 3 is a flowchart representation of a method 300 of establishing a communication session in accordance with some embodiments. In some embodiments (and as detailed below as an example), the method 300 is performed by a central data center, such the central data center 130 of FIG. 1A, or a portion thereof (such as the application function 199 or AF-C 139 of FIG. 2). In some embodiments, the method 300 is performed by processing logic, including hardware, firmware, software, or a combination thereof. In some embodiments, the method 300 is performed by a processor executing code stored in a non-transitory computer-readable medium (e.g., a memory). Briefly, the method 300 includes establishing a first communication session between an application function (AF) and a user equipment (UE) assigned a first IP address and, in response to the UE changing location, establishing a second communication session between the AF and the UE assigned a second IP address.

The method 300 begins, in block 310, with the central data center establishing a first communication session between an AF and a UE assigned a first IP address. For example, in FIG. 2A, establishing the first communication session includes receiving, by the SMF 134 from the UE 190, a PDU session establishment request 204. As another example, in FIG. 2A, establishing the first communication session includes receiving, by the PCF 136 from the SMF 134, a PCC session establishment request 206.

In various implementations, establishing the first communication session includes receiving a session establishment request including an indication of an SCC Mode in which the UE IP address can be changed. In various implementations, the indication of the SSC Mode is received by a session management function (SMF) and forwarded to a policy management function (PCF). For example, in FIG. 2A, the PDU session establishment request 204 (including an indication of either SSC Mode 2 or 3) is received by the SMF 134 and the indication is forwarded to the PCF 136 in the PCC session establishment request 206.

The method 300 continues, in block 320, with the AF determining that the user equipment has changed location. In various implementations, determining, by the AF, that the UE has changed location comprises sending, by the AF, a request for a notification when the UE changes location and receiving, by the AF, a notification that the UE has changed location. For example, in FIG. 2A, the AF 199 sends the location update subscribe 212 and receives the location update 230. In some embodiments, the request for a notification and the notification are transmitted via an N5 interface. For example, in FIG. 2A, the AF 199 and the PCF 136 exchange N5 establishment communications 210 to establish an N5 interface via which the location update subscribe 212 and location update 230 are transmitted. In various implementations, the method 300 is performed in an Evolved Packet Core (EPC) implementation. Thus, in some embodiments, the request for a notification and the notification are transmitted via an Rx interface.

In some embodiments, determining, by the AF, that the UE has changed location comprises determining, by the AF, that the UE has entered a predefined geographical location. For example, in FIG. 2A, the location update 230 is received in response to the UE 190 associating with an access node (e.g., the third access node 130C) specified by the location update subscribe 212 and the UE 190 is, therefore, within a predefined geographical location associated with the third access node 130C. For example, in some embodiments, the AF determines that the UE has changed location by inspecting an access node identifier of an access node included in a header of a packet transmitted by the UE and correlating the access node identifier with the geographical location of the access node. In some embodiments, the AF determines that the UE has changed location by receiving GPS coordinates of the UE, which may be included in a header of packet transmitted by the UE.

The method 300 continues, at block 330, with the AF, in response to determining that the UE has changed location, sending a request that the UE be assigned a second IP address. For example, in FIG. 2A, in response to receiving the location update 230, the application function 199 sends the IP change request 232.

In some embodiments, the method further includes determining, by the AF, that the UE is to be assigned the second IP address based on a current location of the UE and one or more locations of application function resources. Further, in some embodiments, the AF requests that the UE be assigned a second IP address (in block 330) in response to determining that the UE is to be assigned the second IP address. For example, with respect to FIG. 2A, the AF 199 determines that the UE 190 is to be assigned the second IP address based on the current location of the UE 190 (e.g., within the predefined geographical area of the third access node 140C) and locations of AF resources, such as AF-1 119A and AF-2 119B.

In some embodiments, determining, by the AF, that the UE is to be assigned the second IP address includes determining that the current location of the UE is close to a first one of the one or more locations of AF resources. For example, with respect to FIG. 2A, the AF determines that that user equipment 190 is to be assigned the second IP address based on the current location of the UE 190 (e.g., within the predefined geographical area of the third access node 140C) being close to the AF resources of the AF-1 119A.

In some embodiments, the request that the UE be assigned a second IP address (sent by the AF in block 330) includes an indication of a particular network segment. For example, with respect to FIG. 2A, in some embodiments, the IP change request 232 includes an indication of the first edge data center 110A to which the current location of the user equipment 130 is proximate.

The method 300 continues, in block 340, with the central data center establishing a second communication session between the AF and the UE assigned the second IP address. For example, in FIG. 2A, establishing the first communication session includes receiving, by the SMF 134 from the UE 190, a PDU session establishment request 238. As another example, in FIG. 2A, establishing the first communication session includes receiving, by the PCF 136 from the SMF 134, a PCC session establishment request 240.

In some embodiments, the method 300 further includes disestablishing the first communication session. For example, in FIG. 2A, the SMF 134 sends the session delete command 236. In some embodiments, the first communication session is disestablished before the second communication session is established (e.g., the session delete command 236 disestablishes the first communication session. In some embodiments, the first communication session is disestablished after the second communication session is established (e.g., the session delete command 236 indicates a delayed-release time after which the first communication session is disestablished and the second communication session is established before the delayed-release time expires).

In some embodiments, establishing the second communication session includes modifying the first communication session. For example, referring to FIG. 2A, in some embodiments, the session delete command 236 disestablishes a PDU session (e.g., between the UE 190 and the SMF 134), but does not disestablish a PCC session or AF session (e.g., between the UE 190 and, ultimately, the AF 199). Thus, rather than sending a PCC session establishment 240 to the PCF 136, the SMF 134 sends a PCC modification request to the PCF 136 that establishes the second communication session by modifying the first communication session (to indicate the second IP address rather than the first IP address).

Figure 4:
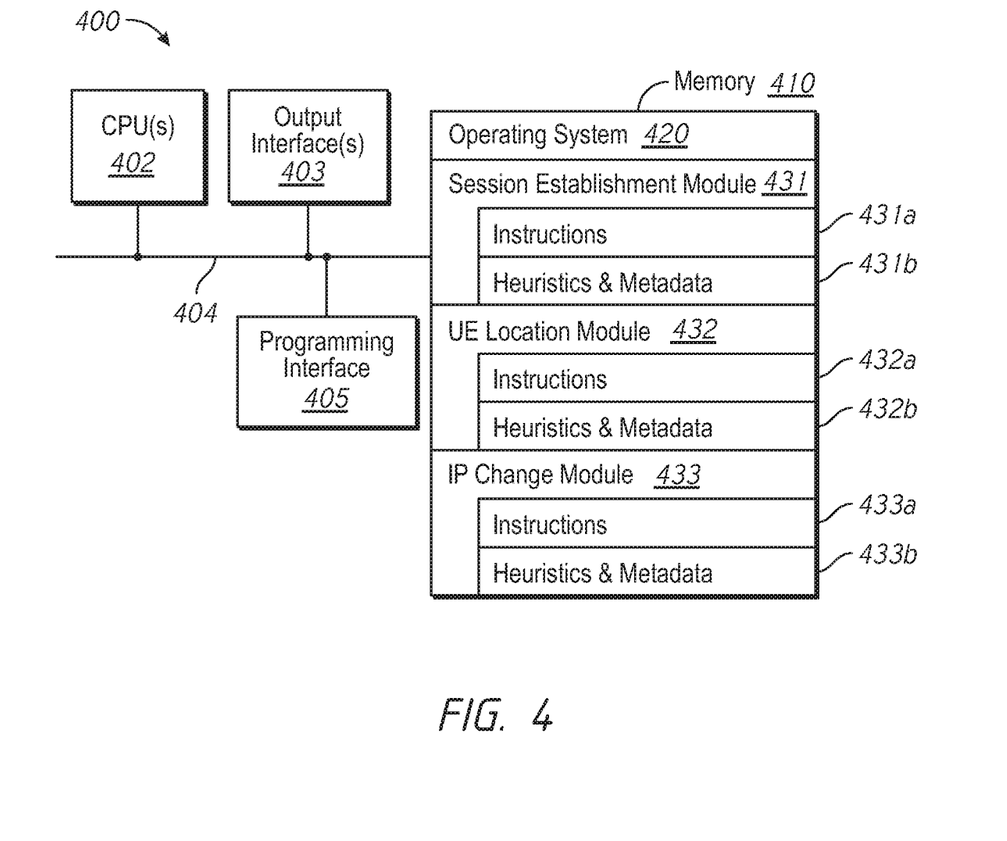
FIG. 4 is a block diagram of an example device in accordance with some embodiments.

FIG. 4 is a block diagram of an example device 400 in accordance with some embodiments. In some embodiments, the device corresponds to the central data center 130 of FIG. 1 or portions thereof and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 400 includes one or more processing units (CPU(s)) 402 (e.g., processors), one or more output interfaces 403 (e.g., a network interface), a memory 410, a programming interface 405, and one or more communication buses 404 for interconnecting these and various other components.

In some embodiments, the communication buses 404 include circuitry that interconnects and controls communications between system components. The memory 410 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 410 optionally includes one or more storage devices remotely located from the CPU(s) 402. The memory 410 comprises a non-transitory computer readable storage medium. Moreover, in some embodiments, the memory 410 or the non-transitory computer readable storage medium of the memory 410 stores the following programs, modules and data structures, or a subset thereof including an optional operating system 420, a session establishment module 431, a UE location module 432, and an IP change module 433. In some embodiments, one or more instructions are included in a combination of logic and non-transitory memory. The operating system 420 includes procedures for handling various basic system services and for performing hardware dependent tasks.

In some embodiments, the session establishment module 431 is configured to establishing a first communication session between an application function (AF) and a user equipment (UE) assigned a first IP address. To that end, the reputation score module 431 includes a set of instructions 431a and heuristics and metadata 431b.

In some embodiments, the UE location module 432 is configured to determine, by the AF, that the UE has changed location. To that end, the UE location module 432 includes a set of instructions 432a and heuristics and metadata 432b.

In some embodiments, the IP change module 433 is configured in response to determining that the UE has changed location, sending, by the AF, a request that the UE be assigned a second IP address. To that end, the IP change module 433 includes a set of instructions 433a and heuristics and metadata 433b.

In some embodiments, the session establishment module 431 is further configured to establishing a second communication session between the AF and the UE assigned the second IP address.

Although the session establishment module 431, the UE location module 432, and the IP change module 433 are illustrated as residing on a single device 400, it should be understood that in other embodiments, any combination of the session establishment module 431, the UE location module 432, and the IP change module 433 can reside in separate devices. For example, in some embodiments, each of the session establishment module 431, the UE location module 432, and the IP change module 433 reside in a separate device.

Moreover, FIG. 4 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   establishing a first communication session between an application function (AF) and a user equipment (UE) assigned a first Internet Protocol (IP) address;
   determining, by the AF, that the UE has changed location;
   in response to determining that the UE has changed location, sending, by the AF, a request that the user equipment be assigned a second IP address, wherein the request comprises an indication of a particular network segment; and
   establishing a second communication session between the AF and the UE assigned the second IP address.

2. The method of claim 1, wherein establishing the first communication session includes receiving a session establishment request including an indication of a Session and Service Continuity (SCC) Mode in which the UE IP address can be changed.

3. The method of claim 2, wherein the indication of the SSC Mode is received by a session management function (SMF) and forwarded to a policy management function (PCF).

4. The method of claim 1, wherein determining, by the AF, that the UE has changed location comprises:
   sending, by the AF, a request for a notification when the UE changes location; and
   receiving, by the AF, a notification that the UE has changed location.

5. The method of claim 4, when the request for a notification and the notification are transmitted via an N5 interface or an Rx interface.

6. The method of claim 1, wherein determining, by the AF, that the UE has changed location comprises determining, by the AF, that the UE has entered a predefined geographical area.

7. The method of claim 1, further comprising determining, by the AF, that the UE is to be assigned the second IP address based on a current location of the UE and one or more locations of AF resources, wherein the AF requests that the UE be assigned a second IP address in response to determining that the UE is to be assigned the second IP address.

8. The method of claim 7, wherein determining, by the AF, that the UE is to be assigned the second IP address includes determining that the current location of the UE is close to a first one of the one or more locations of AF resources.

9. The method of claim 1, further comprising, prior to establishing the second communication session, disestablishing the first communication session.

10. The method of claim 1, further comprising, after establishing the second communication session, disestablishing the first communication session.

11. The method of claim 1, wherein establishing the second communication session includes modifying the first communication session.

12. An electronic device comprising:
a network interface; and
one or more processors configured to:
establish a first communication session between an application function (AF) and a user equipment (UE) assigned a first Internet Protocol (IP) address;
determine, by the AF, that the UE has changed location;
in response to determining that the UE has changed location, send, by the AF, a request that the UE be assigned a second IP address, wherein the request comprises an indication of a particular network segment; and
establish a second communication session between the AF and the UE assigned the second IP address.

13. The electronic device of claim 12, wherein establishing the first communication session includes receiving a session establishment request including an indication of a Session and Service Continuity (SCC) Mode in which the UE IP address can be changed.

14. The electronic device of claim 12, wherein the AF determines that the user equipment has changed location by:
sending, by the AF, a request for a notification when the UE changes location; and
receiving, by the AF, a notification that the UE has changed location.

15. The electronic device of claim 12, wherein the one or more processors are configured to determine, by the AF, that the UE is to be assigned the second IP address based on a current location of the UE and one or more locations of AF resources, wherein the AF requests that the UE be assigned a second IP address in response to determining that the UE is to be assigned the second IP address.

16. The electronic device of claim 15, wherein the AF determines that the UE is to be assigned the second IP address by determining that the current location of the UE is close to a first one of the one or more locations of AF resources.

17. A non-transitory computer-readable medium encoding instructions which, when executed by a processor of an electronic device, causes the electronic device to:
establish a first communication session between an application function (AF) and a user equipment (UE) assigned a first Internet Protocol (IP) address;
determine, by the AF, that the UE has changed location;
in response to determining that the UE has changed location, send, by the AF, a request that the UE be assigned a second IP address, wherein the request comprises an indication of a particular network segment; and
establish a second communication session between the AF and the UE assigned the second IP address.

18. The non-transitory computer-readable medium of claim 17, wherein the AF determines that the user equipment has changed location by:
sending, by the AF, a request for a notification when the UE changes location; and
receiving, by the AF, a notification that the UE has changed location.

19. The non-transitory computer-readable medium of claim 17, wherein the instructions, when executed by the processor of the electronic device, causes the electronic device to determine, by the AF, that the UE is to be assigned the second IP address based on a current location of the UE and one or more locations of AF resources, wherein the AF requests that the UE be assigned a second IP address in response to determining that the UE is to be assigned the second IP address.

20. The non-transitory computer-readable medium of claim 17 wherein determining, by the AF, that the UE has changed location comprises determining, by the AF, that the UE has entered a predefined geographical area.

* * * * *